United States Patent Office 2,923,604
Patented Feb. 2, 1960

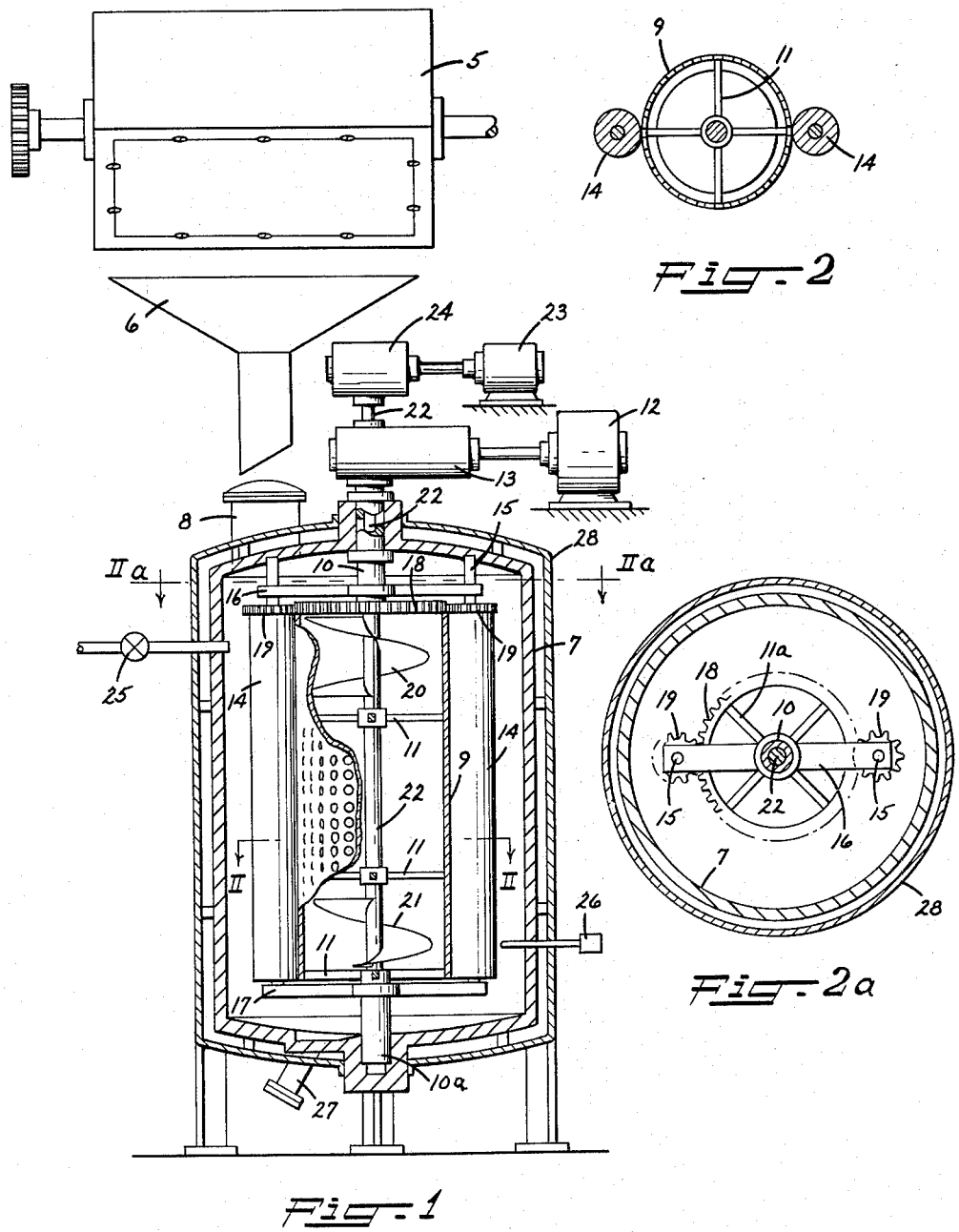

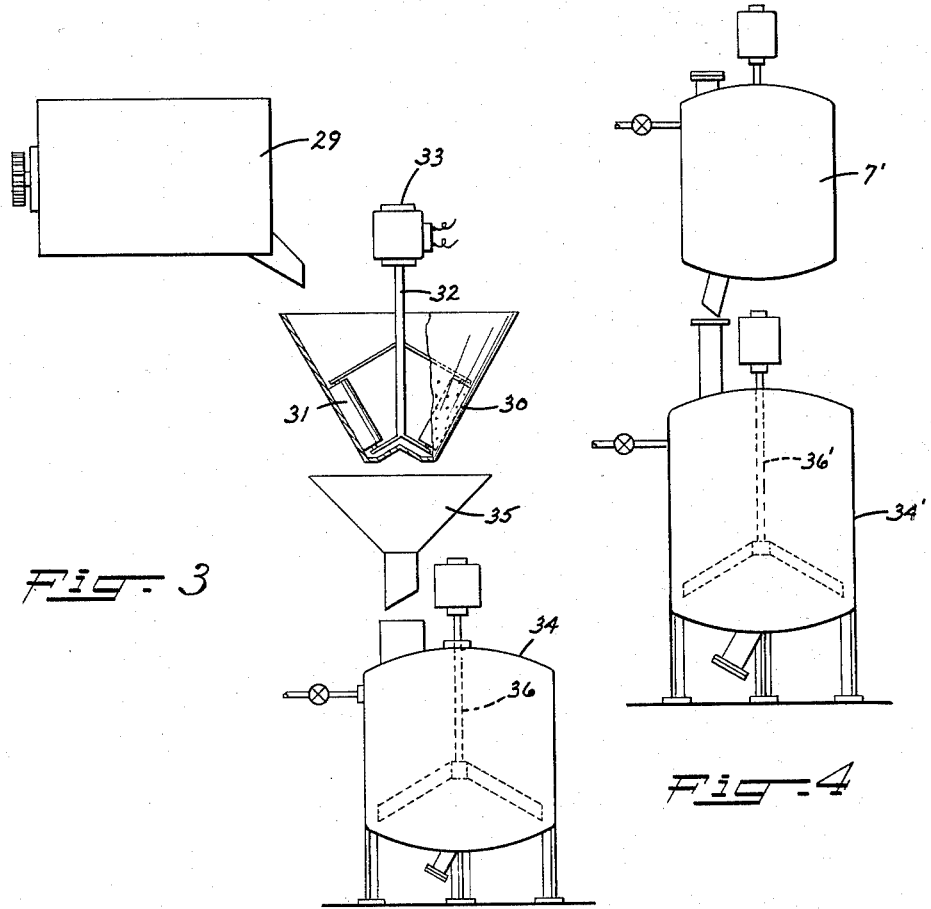
Fig. 3
Fig. 4
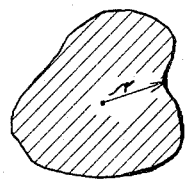
Fig. 5

2,923,604

XANTHATE DISSOLVER

Harry Fawley, Lewistown, Michael Golben, Ridley Park, and David J. Dubé, Burnham, Pa., assignors to American Viscose Corporation, Philadelphia, Pa., a corporation of Delaware Original application August 13, 1954, Serial No. 449,598. Divided and this application February 18, 1957, Serial No. 645,389

4 Claims. (Cl. 23—286)

This invention relates to the production of viscose and more particularly to a method and apparatus to convert cellulose xanthate crumbs into a viscose solution. This is a division of Serial No. 449,598, filed August 13, 1954, now abandoned.

There are minor variations in the processes employed by different manufacturers in preparing viscose for use in making rayon and cellophane, but the process is now fairly conventional. In general, the cellulose (cotton linters, purified wood pulp, or the like) is impregnated (steeped) with concentrated aqueous sodium hydroxide to form alkali cellulose, the excess caustic soda solution squeezed out, the pressed cake shredded into crumbs, the crumbs aged under controlled conditions (time, temperature, exposure to oxygen, etc.) to degrade the cellulose for proper viscose viscosity, the aged crumbs treated with carbon bisulfide to produce cellulose xanthate (a lumpy orange colored product varying from a mealy to a sticky consistency), the xanthate dissolved or dispersed in dilute aqueous caustic alkali, the solution or dispersion filtered and the resultant viscose ripened (aged) until suitable for extrusion and regeneration into filaments, films, tubes and the like.

Due to the nature of the cellulose xanthate, i.e., its stickiness and tendency to form relatively large balls or crumbs, it has been a particularly difficult problem to dissolve the cellulose xanthate in an alkaline solution. Another difficulty encountered in dissolving the xanthate is the presence in the xanthate crumbs of alkali-insoluble cellulosic particles, e.g., coated fibers, fiber gel and gels as well as extraneous matter that may be picked up in the viscose making process. These cellulosic particles are microscopic in size with diameters ranging from sub-microscopic to 100 microns as distinguished from the visible microscopic crumbs composed of bundles of alkali-soluble xanthated alkali cellulose fibers. In the prior art methods of dissolving, there has been no differentiation as to work done on the dissolved viscose, insoluble cellulosic particles and xanthate crumbs.

It has been discovered that the energy expended in performing attrition on completely dissolved xanthate and the insoluble cellulose particles is not only unnecessary, but that the resulting comminution of the insoluble particles permits their passage through the coarse filter media into the fine filter material where the passageways are easily clogged, and increases the probability that some of the shredded gels and fiber gels will pass all filters and contribute to poor quality in the final viscose.

The present invention, therefore, contemplates, and the object thereof is to provide means for a selective comminution whereby only those cellulose xanthate crumbs which cannot be readily penetrated by the alkaline solution are comminuted. The comminution is effected without substantial disintegration of the insoluble particles, and energy expended for dissolving the comminuted crumbs is limited to a nomial agitation or circulation of the undissolved but soluble xanthate until the xanthate crumbs are no longer visible.

Unexpectedly, in addition to considerable savings in energy, the viscose solution produced by the method of this invention can be filtered with less frequent changes in the filtering media and with fewer undissolved particles in the filtered viscose.

Referring now to the drawings:

Fig. 1 is a view partially in section and partially in side elevation of one form of apparatus according to the present invention;

Fig. 2 is a sectional view taken along the line II—II of Fig. 1;

Fig. 2a is a sectional view taken along the line IIa—IIa of Fig. 1;

Fig. 3 is a diagrammatic view of a modified form of apparatus;

Fig. 4 is a diagrammatic view of another modification; and

Fig. 5 illustrates the determination described hereinbelow of the size and shape of a given xanthate crumb that will readily dissolve without further comminution.

The apparatus shown in Figs. 1 and 2 is described in detail as follows: means for xanthating aged alklali cellulose such as hexagonal churn 5 is provided. A funnel 6 to direct the xanthate into vessel 7 through inlet port 8 may be employed.

Within vessel 7 is rotatably mounted an open-ended cylindrical perforated screen 9 fixed, as best shown in Fig. 2a, by means of spokes 11a to a sleeve 10 which is rotatably mounted in the top portion of vessel 7 and driven by a motor 12 through a gear box 13. An independently rotatable shaft 22 extends through the sleeve 10 and has a bearing at its lower end within a non-rotatable sleeve bearing 10a and spokes 11 extending inwardly from the cylindrical screen 9 are secured at their inner ends to sleeves which loosely surround the shaft 22. The spokes 11 thus provide lateral support for the screen 9.

A bracket 16 loosely mounted on the sleeve 10 and a bracket 17 secured to the bearing sleeve 10a supports shafts 15 on which are rotatably mounted smooth-surfaced squeeze rollers 14. A ring gear 18 is secured to the upper end of screen 9 and meshes with pinions 19 secured to the squeeze rollers 14 so that as the screen 9 rotates the rollers 14 are rotated in the opposite direction. The axes of rollers 14 are parallel of the axis of cylindrical screen 9 and the surfaces of rollers 14 contact the outside surface of screen 9 along substantially straight lines at any given rotational position so as to provide a nip between the rollers 14 and the screen 9 as each member is rotated simultaneously.

Oppositely pitched screws 20 and 21 are fixed to the rotatable shaft 22. Separate means such as motor 23 through gear box 24 can be provided for rotating shaft 22. Screws 20 and 21 are within cylinder 9 but spaced on shaft 22 near the opposite ends of screen 9. Valve 25 is an inlet for alkaline solutions. Thermometer 26 measures the temperature within the vessel 7. Outlet 27 is provided for discharging the viscose solution. Vessel 7 is circumscribed by a jacket 28 which allows cooling fluid to be circulated between the exterior of vessel 7 and jacket 28 as shown.

In operation, the above described apparatus is charged with both cellulose xanthate crumbs and alkaline solution sufficient to prepare a viscose with predetermined cellulose content, caustic content, etc. Rotation is imparted to both sleeve 10 and shaft 22 causing the perforated screen cylinder 9 to rotate in an opposite direction to the rollers 14 thereby affording means for forcing xanthate crumbs larger than the perforations in cylinder 9 through the perforations and thus comminute or alter the shape of the crumbs so that no point in the mass of any given crumb will be greater than the penetration of the alkaline solution. Oppositely pitched screws 20 and 21 initiate currents in the mixture of alkaline solution and xanthate crumbs that tend to draw the mixture into the inside of the cylinder through the perforations and expel the mixture back to the outside of the cylinder through the ends thereof to be again drawn through the perforations. The solution of dissolved xanthate crumbs in the alkaline solution thus acts as a medium for directing the "oversize" crumbs into the nip of screen 9 and rollers 14. As rotation of both sleeve 10 and shaft 22 continues, substantially all of the xanthate crumbs tend to pass through the perforations in cylinder 9 without being forced by the rollers 14, and, therefore, rotation of sleeve 10 may be discontinued after sufficient comminution of the crumb and circulation of the xanthate-alkaline solution mixture by screws 20 and 21 continued until the xanthate crumbs are no longer visible. The viscose solution is then discharged, filtered, aged, and extruded to form fibers or film.

Referring to Fig. 3, the alternative of comminution the relatively large crumbs prior to mixing with the alkaline solution is described as follows: crumbs which are discharged from xanthater 29 pass through screen 30 into mixing tank 34 through funnel 35 as the size and shape admits ready penetration by the alkaline solution. The "oversized" crumbs are forced through screen 30 by the motion of the rolls 31 mounted to rotatable shaft 32 which is driven by motor 33. All of the xanthate crumbs therefore are of an acceptable size for efficient dissolution in tank 34 with the aid of a suitable agitating means such as rotary stirrer 36.

Fig. 4 illustrates the other alternative of first forming a concentrated slurry of the xanthate crumbs and less than the amount of alkaline solution to be finally mixed with the xanthate. The slurry is comminuted in vessel 7' having essentially the same structure within as vessel 7 in Fig. 1. The slurry of comminuted xanthate crumbs and alkaline solution is then transferred to tank 34', similar to tank 34, where the remaining quantity of alkaline solution is added and the mixture agitated by stirrer 36', similar to stirrer 36, until xanthate crumbs are no longer visible to the naked eye.

In each of the above alternatives described, there is substantially no disintegration of the microscopic insoluble particles and the comminuting or shaping effect is generally limited to the relatively large xanthate crumbs.

To determine the maximum size of cellulose xanthate crumb which can be readily penetrated by the alkaline solution those skilled in the art can check the ease of solubility of crumbs having a given size. In theory the shape of the crumb is not critical as long as any given point within its mass is not more than a predetermined maximum distance from any point on the surface of the crumb. We have determined that in general this maximum distance is about ¼ of an inch and we prefer that this distance is no more than ⅛ of an inch. In practice, the xanthate crumb is more or less in the shape of a sphere as shown in a cross sectional view of a crumb in Fig. 5 and, therefore, its radius, r, must be less than the above set forth maximum distance for any given point from a point on the surface of the crumb.

The viscose produced by the method of this invention has improved "filterability" and is freer from insoluble matter after filtration than a viscose produced by the attrition methods that are taught by the prior art. "Filterability" is defined as the average rate of change of filter pressure with respect to time, i.e., as the viscose solution is forced through a standard candle filter at a constant rate for a given period of time, the pressure required to force the viscose through the filter increases and the average rate of increase over a period of 6 hours is determined. "Filterability" determined by this method is termed herein the T value. Filterability may also be determined by the standard "plugging factor" test.

Examples 1 and 2 illustrate prior art methods and the remaining examples illustrate this invention and represent preferred embodiments thereof. The T values given for the viscose produced in each example was determined in the same manner so as to give results which indicate the filterability between each viscose solution, a lower value indicating a better filterability.

Example 1

25 pounds of a rayon-sulphite-spruce pulp (alpha cellulose content 88.5% polymerization degree 800) were steeped in an 18% NaOH solution and the excessive lye pressed off. This alkali cellulose was shredded, aged 17 hours at 34° C. and xanthated with an excess of $CS_2$ in a conventional xanthate churn. 8.5 pounds of the resulting cellulose xanthate crumb was mixed with 3 gallons of a 12% sodium hydroxide solution and a viscose solution formed by agitating the mixture and at the same time circulating it through a disintegrator of the attrition type shown in Davidson, U.S. application, Serial No. 547,204, filed July 29, 1944, now abandoned. A solution was apparently formed after 3.5 hours employing this method. The viscose so produced had a viscosity of 36 seconds, a cellulose content of 8.3% and a T value as defined above of 27.

Example 2

25 pounds of the same type of sulphite pulp as used in Example 1 were converted into cellulose xanthate crumbs in accordance with the method of Example 1. 8.5 pounds of the xanthate crumb was mixed with 3 gallons of 14% NaOH solution in a conventional xanthate dissolving vessel wherein the mixture was subject to the disintegrating action of high speed shearing type blades. After three hours a homogeneous solution appeared to have been produced with the same cellulose content and viscosity as the viscose produced in Example 1. The T value was 14.

Example 3

8.5 pounds of cellulose xanthate crumbs were prepared from the same pulp and in the same manner as in Example I and the crumbs varied in size from about ¹⁄₁₆ of an inch in diameter to ¾ inch in diameter. These crumbs were passed over a screen having holes ¼ inch in diameter. Crumbs which did not pass through the screen were forced through by a roller into a vessel containing the ¼ inch or smaller crumb. Three gallons of 12% NaOH solution was added to the vessel and the mixture agitated with a conventional three blade propeller type stirrer. Cooling water was circulated in a jacket surrounding the vessel maintaining the temperature within the vessel at 17.5° C. during dissolution. The xanthate crumbs disappeared from sight in 2.5 hours. The resulting viscose had a viscosity of 32 seconds, a cellulose content of 8.1%, and a T value of 7.

Example 4

8.5 pounds of cellulose xanthate crumb was prepared in the same manner as Example I but the starting material was cotton linters instead of wood pulp. Crumbs which did not pass through a ¼ inch screen were forced through and the entire batch of crumb charged into the same vessel as Example 3 and 3½ gallons of 12% NaOH solution added. The mixture was stirred in the same manner as Example 3 and the temperature kept constant at 17.5° C. during the dissolution. The last crumb disappeared from sight after 1.75 hours of mixing. The resulting viscose had a viscosity of 39 seconds, a cellulose content of 8.7% and a T value of 7.

Example 5

8.5 pounds of cellulose xanthate crumbs from ¹⁄₁₆ to 1 inch in diameter were prepared from the same materials and in the same manner as Example I. The crumbs were charged into a vessel together with three gallons of 14% NaOH solution. The mixture was agitated into larger crumbs comminuted by the apparatus shown in Figure 1, the symmetrical revolving screen 9 having holes ¼ inch in diameter. The last crumbs disappeared in two hours. The temperature during dissolution was kept constant at 17.5° C. The resulting viscose had a viscosity of 36 seconds, a cellulosic content of 8.3% and a T value of 8.

*Example 6*

14 pounds of cellulose xanthate crumbs were prepared from purified sulphite-spruce pulp in accordance with the method set forth in Example I. The diameters of the crumbs ranged from 1/16 inch to ¾ inch and were placed in the same vessel as described in Example 5. 2.5 gallons of 14% NaOH solution was added and the comminution of the larger xanthate crumbs effected as in Example 5. After ½ hour mixing in this vessel, the slurry was charged into another vessel. The slurry mixing vessel was rinsed with two gallons of 14% NaOH solution and this solution added to the slurry in the other vessel. The mixture of the slurry and NaOH solution was agitated for 1.75 hours by a three blade propeller type stirrer driven at 1725 r.p.m. by a ¼ horsepower electric motor, a homogeneous viscose resulting with a viscosity of 37 seconds, a cellulose content of 8.2% and a T value of 7.

It is to be understood that the aforegoing examples and description are merely illustrative and that changes and modifications may be made therein without departing from the spirit and scope of the invention as defined by the appended claims.

We claim:

1. An apparatus for dissolving cellulose xanthate crumbs in an alkaline solution comprising a closed vessel, means for admitting cellulose xanthate crumbs and an alkaline solution into said vessel, an open-ended, perforated, hollow cylindrical member rotatably mounted within said vessel, means for rotating said member about the longitudinal axis thereof, a roller mounted within said vessel on an axis parallel to the axis of said cylindrical member, the surface of said roller being in contact with a surface of said cylindrical member, means for rotating said roller in the direction opposite to the rotation of said cylindrical member whereby the cellulose xanthate crumbs will be caught between the roller and the cylindrical member and forced through the perforations in the latter, and means for circulating the mixture of crumbs and alkaline solution through the perforations of said cylindrical member and the open ends thereof.

2. The apparatus of claim 1 wherein the roller is located outside said cylindrical member.

3. The apparatus of claim 1 wherein a driven shaft extends through said cylindrical member along the longitudinal axis thereof and the means for circulating the mixture comprises oppositely pitched screws mounted on said shaft.

4. The apparatus of claim 3 wherein the roller is located outside said cylindrical member and the mixture is circulated through the perforations of said cylindrical member from the outside to the inside thereof and from the inside back to the outside through the open ends of said member.

References Cited in the file of this patent

UNITED STATES PATENTS 2,614,102     Schlosser et al.     Oct. 14, 1952